July 21, 1970     D. E. ANDREWS, JR., ETAL     3,521,226
MECHANICALLY SCANNED ACOUSTIC TRANSDUCER
Filed Aug. 26, 1968     3 Sheets-Sheet 1

INVENTORS
DANIEL E. ANDREWS, JR.
ARTHUR H. ROSHON, JR.
BY
ATTORNEYS

July 21, 1970   D. E. ANDREWS, JR., ETAL   3,521,226
MECHANICALLY SCANNED ACOUSTIC TRANSDUCER
Filed Aug. 26, 1968   3 Sheets-Sheet 2

INVENTORS
DANIEL E. ANDREWS, JR.
ARTHUR H. ROSHON, JR.
BY
ATTORNEYS

July 21, 1970  D. E. ANDREWS, JR., ETAL  3,521,226
MECHANICALLY SCANNED ACOUSTIC TRANSDUCER
Filed Aug. 26, 1968  3 Sheets-Sheet 3

INVENTORS
DANIEL E. ANDREWS, JR
ARTHUR H. ROSHON, JR
BY
ATTORNEYS

3,521,226
MECHANICALLY SCANNED ACOUSTIC TRANSDUCER
Daniel E. Andrews, Jr., 1563 Yost Drive 92109, and
Arthur H. Roshon, Jr., 1746 Minden Drive 92111,
both of San Diego, Calif.
Filed Aug. 26, 1968, Ser. No. 755,279
Int. Cl. H04r 1/40
U.S. Cl. 340—8
11 Claims

ABSTRACT OF THE DISCLOSURE

A directional transmitting-receiving transducer for sonar signals comprises a right circular conical reflector. A number of rings or discs of active elements, such as piezoelectric ceramics, are stacked to form a rod. The rod is mounted along the axis of the cone so that all acoustical wave energy radiated in radial directions from the rod is collimated by the reflector. By tilting the rod about a point at or near the apex of the reflector, the axis of the beam can be angularly deflected from the center line of the reflector without undue distortion of the shape of the beam.

---

The invention described herein may be manufactured and used by or for the Government of the Untied States of America for governmental purposes without the payment of any royalties thereon or therefor.

BACKGROUND OF THE INVENTION

In the radar and microwave arts it is common practice to collimate or "beam" radiant energy through the use of circular parabolic reflectors. The energy is usually piped via a wave guide or coaxial line to a relatively small aperture at the focal point of the paraboloid. A transverse displacement of the aperture from the focal point is known to cause a corresponding angular displacement of the collimated beam. Unfortunately, since such a parabolic reflector is effective in collimating only that energy which strikes the reflector and which emanates from a surface concentric with a single point near the focal point, the size of the aperture must be small and baffles of some type must be used to prevent unreflected radiation from being transmitted (or received) through the mouth of the reflector or else undesirable distortion of the beam results. These requirements severely restrict the size and design of the aperture used.

The application of reflectors in the acoustic case closely parallels that of the microwave one except that in the acoustic situation the above mentioned aperture is ordinarily the radiating or sensitive surface of the transducer element.

The object of this invention is to provide an improved beam forming and steering device for the transmission and reception of acoustic energy.

A more specific object of this invention is to provide an acoustic beam forming transducer of considerable power the beam of which can be mechanically scanned or nutated without undue distortion, by angular displacement of the transducer element with respect to the axis of the reflector.

Figure 1A:
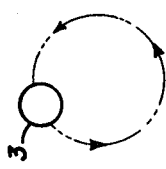
Figure 2:
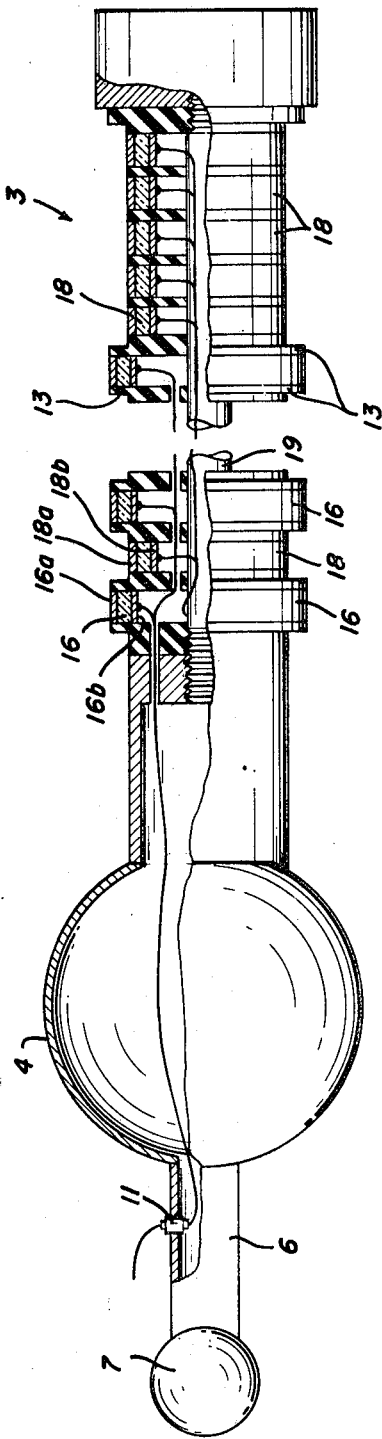
Figure 1:
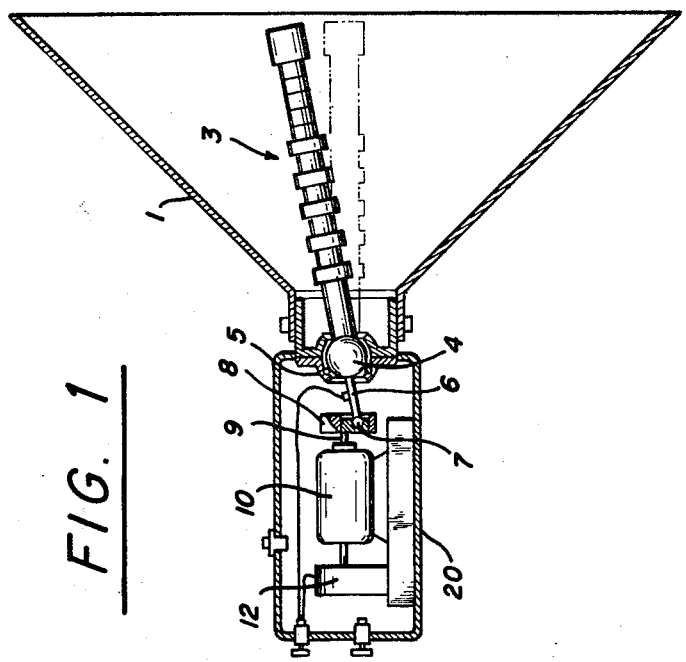
Figure 4:
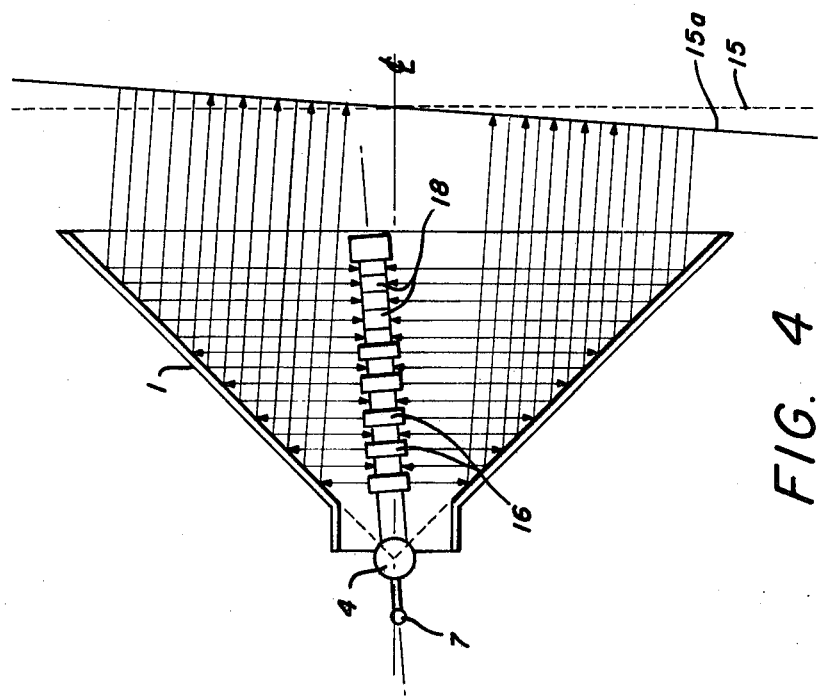
Figure 3:
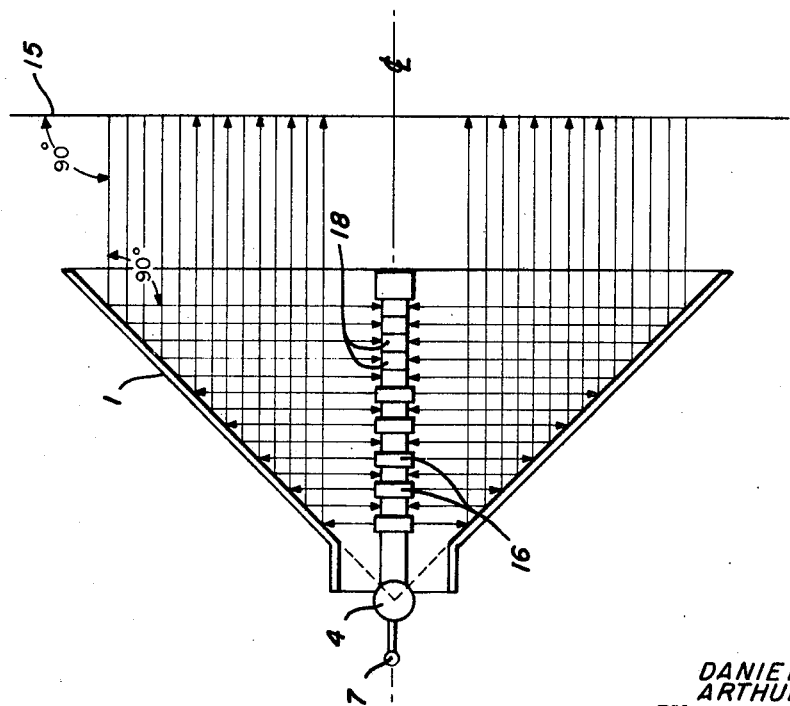
Figure 7:
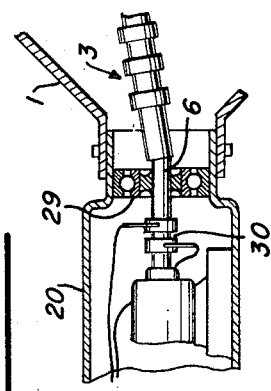
Figure 6:
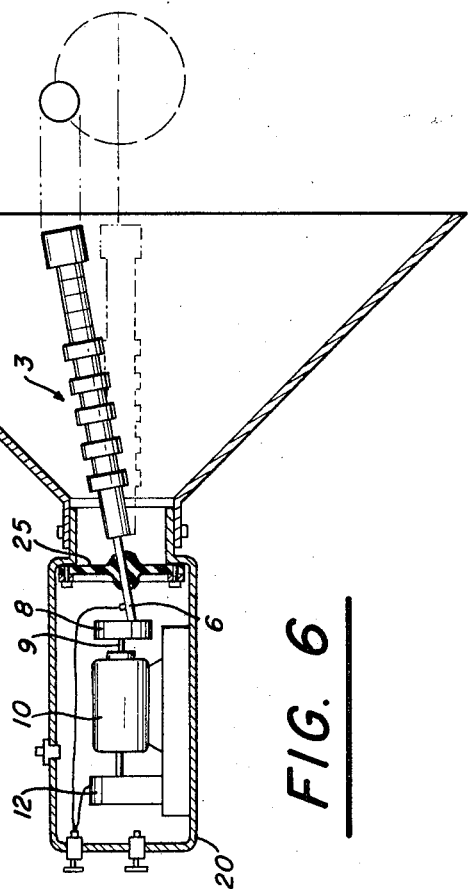
Figure 5:
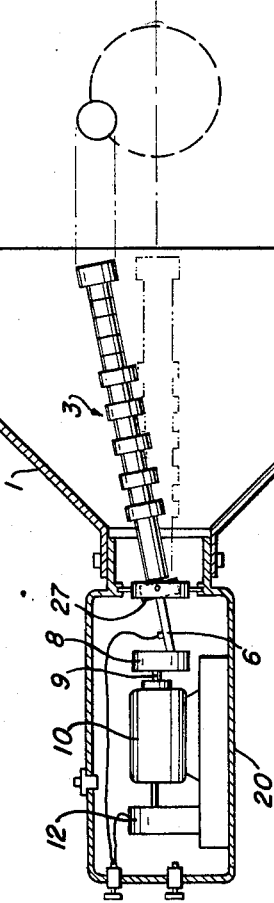

Other objects and features will become apparent to those skilled in the art by referring to the preferred embodiment described in the following specification and shown in the accompanying drawings in which:

FIG. 1 is an elevational view partly in section of a transducer array with a reflector embodying this invention, FIG. 1A is an end view of the transducer rod of FIG. 1 in one scanning pattern, FIG. 2 is a detailed sectioned view of the transducer rod of FIG. 1, FIGS. 3 and 4 are line diagrams showing the wave front and phase relations of the acoustic energy resulting from two positions, respectively, of the transducer array within the reflector, FIGS. 5 and 6 are elevational views, partly in section, of alternating pivot mechanisms for the transducer rod of this invention, and FIG. 7 is an elevational view, partly in section, of means for rotating the transducer rod of this invention.

In FIG. 1 is shown a right circular cone 1. The cone is made of, or lined with, a material that will efficiently reflect acoustic energy.

The rod 3 disposed along the axis of the cone is, as will appear, a rigid unitary stack of transmitting and receiving active transducer elements. For the cases in which simultaneous transmission and reception is not required, only a single stack of elements is employed. The rod is pivotally supported at or near the apex of the cone. The support for the rod is, specifically in FIG. 1, a ball and socket joint. As shown at 4, the support point of the rod is machined spherical in shape and rides, usually liquid-tight, in a corresponding socket 5 so that the rod has freedom of limited movement about the center of the ball.

One alternative to the ball and socket support for the nutating rod 3 shown in FIG. 5 comprises the flexible diaphragm 25. The diaphragm may be clamped along its periphery to the housing 20 and embody a hub at its center for receiving the actuating arm 6. The diaphragm may be of reinformed rubber or thin sheet metal of sufficient strength and flexibility for the task.

In FIG. 6 is shown gimbal 27, with two pairs of orthogonal pivot pins, for giving universal motion to the actuating arm 6 and rod 3.

A fourth alternative for giving the inclined rod 3 simple circular motion is shown in FIG. 7. Instead of wobbling about a point at the apex of the cone 1, the arm 6 and rod 7 is made to rotate in bearing 29 on an axis aligned with the center line of the cone. The rod 3 must, however, be affixed to the journaled arm 6 at a selected angle, to be discussed below. The arm 6 can now be aligned with and coupled directly to the shaft of motor 10. Slip rings 30 with brushes are necessary to connect external circuits to the transducer elements of rod 3.

The characteristics of the transducer rod 3 of interest here is that it will both transmit and receive acoustic energy. As specifically shown in FIG. 2, the transmitting active elements comprise rings 16 of piezo electric material, such as polarized barium titanate or lead zirconate. Electrodes comprising metallic films 16a and 16b deposited on inner and outer surfaces of each ring will cause the rings to expand and contract in diameter in response to signals applied to the electrodes. Rings 16 are spaced along the left or inner portion of the rod. Sandwiched between the transmitting rings and along the right or outer end of the rod are the receiving rings 18, also of piezo electric material and with electrode films 18a and 18b deposited on the inner and outer surfaces. The electrodes are suitably interconnected, and the leads for the transmitting and receiving rings are separately brought out through the bushing 11 to the left of ball 4. The alternate transmitting and receiving rings are acoustically isolated from each other by interposed soft rubber bushings or washers 13. The stack of transmitting rings, receiving rings, and washers are held together under sufficient compression by the center tension rod 19. Alternatively, the rings could be tangentially foiled and poled. Other types of transducing elements such as magnetostrictive rings could be used in place of those shown. It will also be evident that a single set of rings could be used, the single set being used alternatively in transmission and reception.

While the rod may be tilted upon its pivot in various nutating patterns, the commonest pattern is circular, partly because of the simplicity of the driving mechanism for the circular pattern. Further, the circular pattern provides in the output of the hydrophone assembly all the necessary information for a tracking servo system. One such circular scanning mechanism is shown in FIG. 1 where the end of the rod is provided with a short stub or lever arm 6 terminating in the knob 7. The knob, in turn, rides a recess in the disc 8 carried on the shaft 9 extending from the gear case 10. Motor 12 drives the gears within the case. Information concerning the rotational position of the ball 7 and of the transducer rod 3 is easily taken directly from the gear train shown, for example, by the incorporation of a suitable synchro transmitter. The diameter of the circle swept by the outer end of the rod 3 depends, of course, on the relative lengths of the rod 3 on one side of the ball 4 and the length of the arm 6 on the other side of the ball as well as the diameter of the circle inscribed by the knob 7. Conveniently, the diameter of the circles and the angle of displacement of the rod from the center line of the cone can be varied by the length of the crank arm of disc 8.

As will appear now, the energy into and from the right circular cone is collimated and the degree of deflection of the collimated energy of the beam of the reflector depends upon the tilt angle of the transducer rod 3 with respect to the center line of the cone. In FIG. 3, the rod 3 is shown lying along the center line of the cone. It is important to note that with the rod 3 in this position, the lengths of the paths measured from each element 16 and 18 radially outward to the reflecting surface of the cone and hence, to the right in the figure, to any plane, 15, parallel to the base of the cone are all equal. Hence, if transmitting elements 16 are energized in phase, the outgoing energy will arrive at plane 15 in phase. Likewise, incoming acoustic energy if in phase in plane 15 will arrive at receiving elements 18 in phase. That is to say, the wave front of the collimated energy in FIG. 3 will always be in a plane parallel to the cone base where the rod or array 3 is on the center line of the cone.

If now, the rod 3 is tilted about its pivot to the center line as shown in FIG. 4, so that points along the rod become progressively different distances from the center line, then the wave front plane, now designated 15a correspondingly tilts with respect to the center line. That is, for the distances from all points on the rod to the plane 15a to remain equal for the in-phase wave front condition, the plane must tilt. It follows that as rod 3 is rotated on its pivot 4, the transmitting and receiving lobes of the array correspondingly rotate. Importantly, the beam pattern of the transmitted and received energy remains substantially unchanged in shape, even though the beam is deflected away from the cone center line. The transmit and receive beam patterns can be made quite narrow and the side lobes of one pattern can be made to substantially neutralize the side lobe effects of the other as shown in the inventor's patent 3,243,768, issued Mar. 29, 1966, by causing the principal side lobes of one pattern to fall upon the nulls of the other.

Since one of the principal uses of the device of this invention is in underwater applications, it is preferable that the driving mechanism of FIG. 1 be enclosed in the water-tight casing 20 which can be filled with oil and pressurized or pressure-compensated. The pressure of the oil should be approximately equal to the hydrostatic pressure of the external water so as to prevent seepage in either direction through the seals through the casing.

What is claimed is:
1. A beam forming acoustic transducer comprising in combination:
   a right circular cone;
   a rod disposed along the center line of said cone, said rod comprising a plurality of active transducing elements being adapted to radiate acoustic energy and the remaining elements being adapted to receive acoustic energy;
   said rod being pivotally supported adjacent the apex of said cone so that said rod can be tilted to desired angles with respect to said center line.

2. A mechanically scanned acoustic beam forming assembly comprising:
   a right circular cone of acoustically reflective material;
   a linear array of spaced transducer elements, the transducer elements of said array being mechanically united in a unitary rod-like structure disposed generally along the axis of said cone to collimate and form a beam of the acoustic energy along said axis, selected transducers being electrically connected together and adapted for connection to the output of a transmitter, the remaining transducers being electrically connected together and adapted for connection to the input of a receiver;
   said rod-like structure being pivotally supported at a single point adjacent the apex of said cone for deflecting at will said beam from the axis of said cone.

3. In the beam forming assembly defined in claim 2, the mentioned pivot support comprising a spherical ball formed on one end of said rod-like structure, and
   a socket adapted to receive said ball, affixed to said cone, the center of said socket being substantially at the apex of said cone.

4. The beam forming assembly defined in claim 1 further comprising a lever arm attached to said rod;
   means coupled to said arm for driving said arm, and the connected rod, in a predetermined and repetitious pattern for systematically scanning the beam formed by said cone.

5. In the beam forming assembly defined in claim 2,
   the mentioned pivot support comprising a diaphragm, the diaphragm being attached to one end of said rod-like structure and to said cone, the design and position of the diaphragm being such that the center of angular displacement of the rod-like structure is substantially at the apex of said cone.

6. The beam forming assembly defined in claim 5 further comprising a lever arm attached to said rod-like structure, and
   a means coupled to said arm for driving said arm and the connected rod-like structure in a predetermined and repetitious pattern for systemically scanning the beam formed by said cone.

7. In the beam forming assembly defined in claim 2, the mentioned pivot support comprising a shaft and bearing structure, said shaft being mechanically joined to said rod-like assembly so that the axes of the two intersect at the desired angle and with the axis of said bearing being coincident with that of the cone, and the point of intersection of the axes of the cone and the said rod-like structure being coincident with the apex of the cone, with
   slip-ring or equivalent means for necessary electrical connections to said rod-like transducer element assembly, and
   means coupled to said shaft for rotating said shaft and the connected rod-like structure for systemically scanning the beam formed by said cone in a circular fashion.

8. In the beam forming assembly defined in claim 3 the mentioned pivot support comprising a set of gimbals attached to one end of the rod-like structure, the center of angular rotation of said rod-like structure and gimbal assembly being substantially at the apex of said cone;
   a diaphragm or siphon bellows-like flexible seal for sealing the rod-like structure to said reflecting cone,
   a lever arm attached to said rod-like structure,
   means coupled to said arm for scanning the beam in the desired fashion.

9. A beam forming acoustic transducer comprising in combination:
   a right circular cone;
   a rod-like structure disposed along the center line of said cone, said rod-like structure comprising a plurality of active transducing elements for forming an acoustic beam generally along said center line, said transducing elements being adapted to convert energy from one form to another, including electrical energy and acoustical energy;
   said rod-like structure being pivotally supported adjacent the apex of said cone so that said rod can be tilted to desired angles with respect to said center line, for deflecting the formed beam from said center line.

10. The beam forming acoustic transducer defined in claim 9 further comprising:
   lead wires connected, respectively, to the terminals of said transducing elements, said lead wires being brought to the outside of said cone and adapted for connection to receiving means.

11. The beam forming acoustic transducer defined in claim 9 further comprising:
   lead wires connected, respectively, to the terminals of said transducing elements, said lead wires being brought to the outside of said cone and being adapted for connection to transmitter means.

References Cited

UNITED STATES PATENTS

| | | |
|---|---|---|
| 1,985,251 | 12/1934 | Hayes. |
| 2,292,424 | 8/1942 | Abrahams. |
| 2,922,140 | 1/1960 | Levine et al. |
| 3,007,133 | 10/1961 | Padberg. |
| 3,243,768 | 3/1966 | Roshon et al. _____ 340—10 |
| 3,351,901 | 11/1967 | Padberg. |

RODNEY D. BENNETT, JR., Primary Examiner

B. L. RIBANDO, Assistant Examiner

U.S. Cl. X.R.

340—9